United States Patent
Patel et al.

(10) Patent No.: US 9,775,179 B2
(45) Date of Patent: *Sep. 26, 2017

(54) METHOD TO ACHIEVE A FULLY ACKNOWLEDGED MODE COMMUNICATION (FAMC) IN PUSH-TO-TALK OVER CELLULAR (POC)

(71) Applicant: Kodiak Networks Inc., Plano, TX (US)

(72) Inventors: Krishnakant M. Patel, Richardson, TX (US); Ravi Ayyasamy, Richardson, TX (US); Brahmananda R. Vempati, Dallas, TX (US)

(73) Assignee: Kodiak Networks, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,013

(22) Filed: Oct. 19, 2016

(65) Prior Publication Data

US 2017/0041962 A1    Feb. 9, 2017

Related U.S. Application Data

(63) Continuation of application No. 14/286,427, filed on May 23, 2014, now Pat. No. 9,485,787.

(60) Provisional application No. 61/826,895, filed on May 23, 2013.

(51) Int. Cl.
| | |
|---|---|
| *H04W 4/00* | (2009.01) |
| *H04W 76/00* | (2009.01) |
| *H04W 4/10* | (2009.01) |
| *H04W 4/08* | (2009.01) |
| *H04W 48/04* | (2009.01) |

(52) U.S. Cl.
CPC .......... *H04W 76/005* (2013.01); *H04W 4/08* (2013.01); *H04W 4/10* (2013.01); *H04W 48/04* (2013.01)

(58) Field of Classification Search
CPC .... H04W 88/06; H04W 76/005; H04W 84/08
USPC .......... 370/310–339; 455/415, 419, 518, 519
See application file for complete search history.

(56) References Cited

U.S. PATENT DOCUMENTS

| | | |
|---|---|---|
| 3,912,874 A | 10/1975 | Botterell et al. |
| 4,796,293 A | 1/1989 | Blinken et al. |
| 5,353,328 A | 10/1994 | Jokimies |

(Continued)

FOREIGN PATENT DOCUMENTS

| | | |
|---|---|---|
| GB | 2338150 A | 8/1999 |
| JP | 200392776 A | 3/2003 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI.

(Continued)

*Primary Examiner* — Iqbal Zaidi
(74) *Attorney, Agent, or Firm* — Slater Matsil, LLP

(57) ABSTRACT

A system and method for providing advanced voice services in a wireless communications network, and more specifically, a method and framework to achieve a Fully Acknowledged Mode Communication (FAMC) in Push-to-talk-over-Cellular (PoC) is provided. A FAMC call session is a PoC call session that can only be established when all members of a set are available.

26 Claims, 2 Drawing Sheets

(56) References Cited

U.S. PATENT DOCUMENTS

| | | | |
|---|---|---|---|
| 5,442,809 A | 8/1995 | Diaz et al. | |
| 5,546,449 A | 8/1996 | Hogan et al. | |
| 5,711,011 A | 1/1998 | Urs et al. | |
| 5,752,196 A | 5/1998 | Ahvenainen et al. | |
| 5,987,318 A | 11/1999 | Alperovich et al. | |
| 5,987,331 A | 11/1999 | Grube et al. | |
| 6,011,976 A | 1/2000 | Michaels et al. | |
| 6,021,326 A | 2/2000 | Nguyen | |
| 6,138,011 A | 10/2000 | Sanders, III et al. | |
| 6,141,556 A | 10/2000 | Dougherty et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,473,501 B1 | 10/2002 | Paulsrud | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,725,053 B2 | 4/2004 | Rosen et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,993,355 B1 | 1/2006 | Pershan | |
| 6,996,414 B2 | 2/2006 | Vishwanathan et al. | |
| 7,026,926 B1 | 4/2006 | Walker, III | |
| 7,043,266 B2 | 5/2006 | Chaturvedi et al. | |
| 7,082,316 B2 | 7/2006 | Eiden et al. | |
| 7,085,364 B1 | 8/2006 | Ahmed et al. | |
| 7,099,291 B2 | 8/2006 | Harris et al. | |
| 7,123,905 B1 | 10/2006 | Allaway et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,330,540 B2 | 2/2008 | Darby et al. | |
| 7,366,535 B2 | 4/2008 | Glass et al. | |
| 7,403,775 B2 | 7/2008 | Patel et al. | |
| 7,460,861 B2 | 12/2008 | Zabawskyj | |
| 7,529,557 B2 | 5/2009 | Farrill | |
| 7,689,238 B2 | 3/2010 | Biswas et al. | |
| 7,738,861 B2 | 6/2010 | Fournier | |
| 7,738,892 B2 | 6/2010 | Ayyasamy et al. | |
| 7,738,896 B2 | 6/2010 | Patel et al. | |
| 7,751,348 B2 | 7/2010 | Shaffer et al. | |
| 7,764,950 B2 | 7/2010 | Patel et al. | |
| 7,787,896 B2 | 8/2010 | Kundu et al. | |
| 7,797,010 B1 | 9/2010 | Manroa et al. | |
| 7,813,722 B2 | 10/2010 | Patel et al. | |
| 7,853,279 B2 | 12/2010 | Patel et al. | |
| 8,036,692 B2 | 10/2011 | Ayyasamy et al. | |
| 8,244,252 B2 | 8/2012 | Descombes | |
| 8,280,423 B2 * | 10/2012 | Siegel | H04W 4/06 455/518 |
| 8,369,829 B2 | 2/2013 | Nagubhai et al. | |
| 8,478,261 B2 | 7/2013 | Vempati et al. | |
| 8,498,660 B2 | 7/2013 | Lawler et al. | |
| 8,670,760 B2 | 3/2014 | Lawler et al. | |
| 8,676,189 B2 | 3/2014 | Lawler et al. | |
| 2001/0005372 A1 | 6/2001 | Cave et al. | |
| 2002/0009990 A1 | 1/2002 | Kleier et al. | |
| 2002/0024943 A1 | 2/2002 | Karaul et al. | |
| 2002/0077136 A1 | 6/2002 | Maggenti et al. | |
| 2002/0086659 A1 | 7/2002 | Lauper | |
| 2002/0086676 A1 | 7/2002 | Hendrey et al. | |
| 2002/0102989 A1 | 8/2002 | Calvert et al. | |
| 2002/0187750 A1 | 12/2002 | Majumdar | |
| 2002/0196781 A1 | 12/2002 | Salovuori | |
| 2003/0009463 A1 | 1/2003 | Gallant | |
| 2003/0016632 A1 | 1/2003 | Refai et al. | |
| 2003/0017836 A1 | 1/2003 | Vishwanathan et al. | |
| 2003/0021400 A1 | 1/2003 | Grandgent et al. | |
| 2003/0078064 A1 | 4/2003 | Chan | |
| 2003/0119540 A1 | 6/2003 | Mathis | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden et al. | |
| 2004/0095954 A1 | 5/2004 | Varney et al. | |
| 2004/0121760 A1 | 6/2004 | Wetman et al. | |
| 2004/0127233 A1 | 7/2004 | Harris et al. | |
| 2004/0152441 A1 | 8/2004 | Wong | |
| 2004/0176100 A1 | 9/2004 | Florkey et al. | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0219941 A1 | 11/2004 | Haaramo et al. | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0119012 A1 | 6/2005 | Merheb et al. | |
| 2005/0143135 A1 | 6/2005 | Brems et al. | |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0261016 A1 | 11/2005 | Patel et al. | |
| 2006/0003740 A1 | 1/2006 | Munje | |
| 2006/0003751 A1 | 1/2006 | Vo | |
| 2006/0019654 A1 | 1/2006 | Farrill | |
| 2006/0029189 A1 | 2/2006 | Patel et al. | |
| 2006/0030347 A1 | 2/2006 | Biswas | |
| 2006/0056361 A1 | 3/2006 | Jiang et al. | |
| 2006/0067499 A1 | 3/2006 | Oliveira et al. | |
| 2006/0078064 A1 | 4/2006 | Schmidt et al. | |
| 2006/0094455 A1 | 5/2006 | Hannu et al. | |
| 2006/0116150 A1 | 6/2006 | Bhutiani | |
| 2006/0128411 A1 | 6/2006 | Turcanu | |
| 2006/0178138 A1 | 8/2006 | Ostroff et al. | |
| 2006/0189337 A1 | 8/2006 | Farrill et al. | |
| 2006/0198334 A1 | 9/2006 | Civanlar et al. | |
| 2006/0229090 A1 | 10/2006 | LaDue | |
| 2006/0234687 A1 | 10/2006 | Patel et al. | |
| 2007/0037562 A1 | 2/2007 | Smith-Kerker et al. | |
| 2007/0037597 A1 | 2/2007 | Biswas et al. | |
| 2007/0037598 A1 | 2/2007 | Ayyasamy et al. | |
| 2007/0049314 A1 | 3/2007 | Balachandran et al. | |
| 2007/0070976 A1 | 3/2007 | Mussman et al. | |
| 2007/0099609 A1 | 5/2007 | Cai | |
| 2007/0133757 A1 | 6/2007 | Girouard et al. | |
| 2007/0154005 A1 | 7/2007 | Daigle | |
| 2007/0189487 A1 | 8/2007 | Sharland et al. | |
| 2007/0190492 A1 | 8/2007 | Schmitt | |
| 2007/0190984 A1 | 8/2007 | Ayyasamy et al. | |
| 2007/0197234 A1 | 8/2007 | Gill et al. | |
| 2007/0204039 A1 | 8/2007 | Inamdar | |
| 2007/0217591 A1 | 9/2007 | Yasuma | |
| 2007/0218885 A1 | 9/2007 | Pfleging et al. | |
| 2007/0253347 A1 | 11/2007 | Patel et al. | |
| 2008/0064364 A1 | 3/2008 | Patel et al. | |
| 2008/0126230 A1 | 5/2008 | Bellora et al. | |
| 2008/0147671 A1 | 6/2008 | Simon et al. | |
| 2008/0181145 A1 * | 7/2008 | Chowdhury | H04W 4/08 370/310 |
| 2008/0299953 A1 | 12/2008 | Rao | |
| 2009/0092116 A1 | 4/2009 | Jiang et al. | |
| 2009/0119678 A1 | 5/2009 | Shih et al. | |

(56) References Cited

U.S. PATENT DOCUMENTS

| | | |
|---|---|---|
| 2009/0149167 A1 | 6/2009 | Patel et al. |
| 2009/0209235 A1 | 8/2009 | Lawler et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0148210 A1 | 5/2014 | Kundu et al. |

FOREIGN PATENT DOCUMENTS

| | | |
|---|---|---|
| WO | 0069189 A1 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A1 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29. XP002345778, http:(_ !_www.nokia.com /_downloads !_ solutions !_govemment!_ SD114EN gov.pdf.

Skype: "Skype". Web Archive—Skype, May 22, 2004, pp. 1-2. XP002345780 http:(_ (_web.archive.org!_ web!_20040522201 727 http:(_ (_www.skJz:pe.com.

Trachwell: "TrackWell Software and Tetra Iceland deliver value added services to Tetra users", trackwell.com, Oct. 2002, pp. 1-1. XP002345781, http:!_!_ www.trackwell.com /_news!_ news twandtetra.htm.

* cited by examiner

METHOD TO ACHIEVE A FULLY ACKNOWLEDGED MODE COMMUNICATION (FAMC) IN PUSH-TO-TALK OVER CELLULAR (POC)

CROSS-REFERENCE TO RELATED APPLICATIONS

This application is a continuation of U.S. patent application Ser. No. 14/286,427, filed May 23, 2014, entitled "Method to Achieve a Fully Acknowledged Mode Communication (FAMC) in Push-to-Talk Over Cellular (PoC)," which claims the benefit of U.S. Provisional Application 61/826,895, filed May 23, 2013, entitled "Method to Achieve a Fully Acknowledged Mode Communication (FAMC) in Push-to-Talk Over Cellular (PoC)," which applications are hereby incorporated by reference.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,479 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. No. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/584,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,415;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896;

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (PoC) CALL SETUP OPTIMIZATIONS,"

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694, filed Dec. 14, 2011, by Ravi Ayyasamy, Gorachand Kundu, Krishnakant M. Patel, Brahmananda R. Vempati, Harisha Mahabaleshwara Negalaguli, Shiva Koteshwara Kiran Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),";

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292, filed Jun. 13, 2012, by Krishnakant M. Patel, Brahmananda R. Vempati, Anand Narayanan, and Gregory J. Morton, entitled "PUSH-TO-TALK CASE OR SLEEVE FOR CONVERTING GENERIC DEVICES TO FUNCTION LIKE PURPOSE-BUILT PUSH-TO-TALK DEVICES," U.S. Provisional Application Ser. No. 61/682,524, filed Aug. 13, 2012, by Krishnakant M. Patel, Brahmananda R. Vempati, Anand Narayanan, and Gregory J. Morton, entitled "RUGGEDIZED PUSH-TO-TALK (PTT) CASE," and U.S. Provisional Application Ser. No. 61/705,748, filed Sep. 26, 2012, by Krishnakant M. Patel, Brahmananda R. Vempati, Anand Narayanan, Gregory J. Morton, and Ravi Ayyasamy, entitled "PUSH-TO-TALK CASE OR SLEEVE FOR CONVERTING GENERIC DEVICES TO FUNCTION LIKE PURPOSE-BUILT PUSH-TO-TALK DEVICES," and U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," which application claims the benefit under 35 U.S.C. Section 119(e) of U.S. Provisional Application Ser. No. 61/593,485, filed Feb. 1, 2012, by Krishnakant M. Patel, Harisha Mahabaleshwara Negalaguli, Brahmananda R. Vempati, Shiva Koteshwara Kiran Cheedella, Arun Velayudhan, Raajeev Kuppa, and Gorachand Kundu, entitled "WiFi INTERWORKING SOLUTIONS FOR PUSH-TO-TALK OVER CELLULAR (PoC) IN THE OPEN MOBILE ALLIANCE (OMA) STANDARD,"

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," which application claims the benefit under 35 U.S.C. Section 119(e) of U.S. Provisional Application Ser. No. 61/730,856, filed Nov. 28, 2012, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE,"

P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109, filed May 1, 2013, by Harisha M. Negalaguli, Krishnakant M. Patel, Arun Velayudhan, Ramu Kandula, Syed N. Khadar, and Subramanyam N. Prashanth, entitled "VOICE-OVER-IP (VOIP) DENIAL OF SERVICE (DOS) PROTECTION MECHANISMS," and U.S. Provisional Application Ser. No. 61/821,975, filed May 10, 2013, by Krishnakant M. Patel, Harisha M. Negalaguli, Arun Velayudhan, and Ramu Kandula, entitled "PROTECTION MECHANISMS FROM ATTACKS,"

all of which applications are incorporated by reference herein.

BACKGROUND OF THE INVENTION

1. Field of the Invention

This invention relates in general to advanced voice services in wireless communications networks, and more specifically, to a method and framework to achieve a fully acknowledged mode communication (FAMC) in Push-to-talk-over-Cellular (PoC).

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

Nonetheless, there is a need in the art for improvements to the methods and systems for delivering the advanced voice services, such as PoC, that comply with both existing and emerging wireless packet-based standards and yet provide superior user experiences. Many existing implementations of PoC suffer from an inferior user experience. The present invention satisfies the need for a superior user experience, and also defines procedures for practical implementation of PoC in commercial, standards-based, cellular networks.

SUMMARY

To overcome the limitations in the prior art described above, and to overcome other limitations that will become apparent upon reading and understanding the present specification, the present invention discloses a system and method for providing advanced voice services in one or more wireless communications networks, and more specifically, to a method and framework to achieve a fully acknowledged mode communication (FAMC) in Push-to-talk-over-Cellular (PoC).

The system and method includes one or more servers that interface to the wireless communications networks to perform advanced voice services for one or more mobile units in the wireless communications networks, wherein the advanced voice services include an instant two-way half-duplex voice call within a group of the mobile units comprising a Push-to-talk-over-Cellular (PoC) call session. Both the servers and the mobile units that use the advanced group services communicate with each other using control messages within the wireless communications networks, and at least one of the servers switches voice messages for the advanced group services between the mobile units across the wireless communications networks. At least one of the servers manages the PoC call session by acting as an arbitrator for the PoC call session and controls the sending of the control messages and the voice messages to and from the mobile units. Moreover, the PoC call session comprises a Fully Acknowledged Mode Communication (FAMC) call session that can only be established when all members of a set are available for the PoC call session, wherein the set comprises all or part of the group of mobile units.

An FAMC Member Set includes one or more criteria that determine whether the set is available for the PoC call session. The criteria may identify one or more of the members that must be available for the PoC call session, a number of the members that must be available for the PoC call session, and/or one or more geographical locations of the members that must be available for the PoC call session.

The availability or unavailability of the members of the set is monitored in real-time and made available to all watchers of the set through one or more presence notifications. The presence notifications may indicate an availability or unavailability of the set as a whole and/or may indicate an availability or unavailability of individual members of the set.

The availability or unavailability of the members of the set may be determined from presence updates received from the members, by querying the members periodically or based on triggering events, by querying a database, or from the network's capabilities.

BRIEF DESCRIPTION OF THE DRAWINGS

Referring now to the drawings in which like reference numbers represent corresponding parts throughout.

DETAILED DESCRIPTION OF ILLUSTRATIVE EMBODIMENTS

Figure 1:
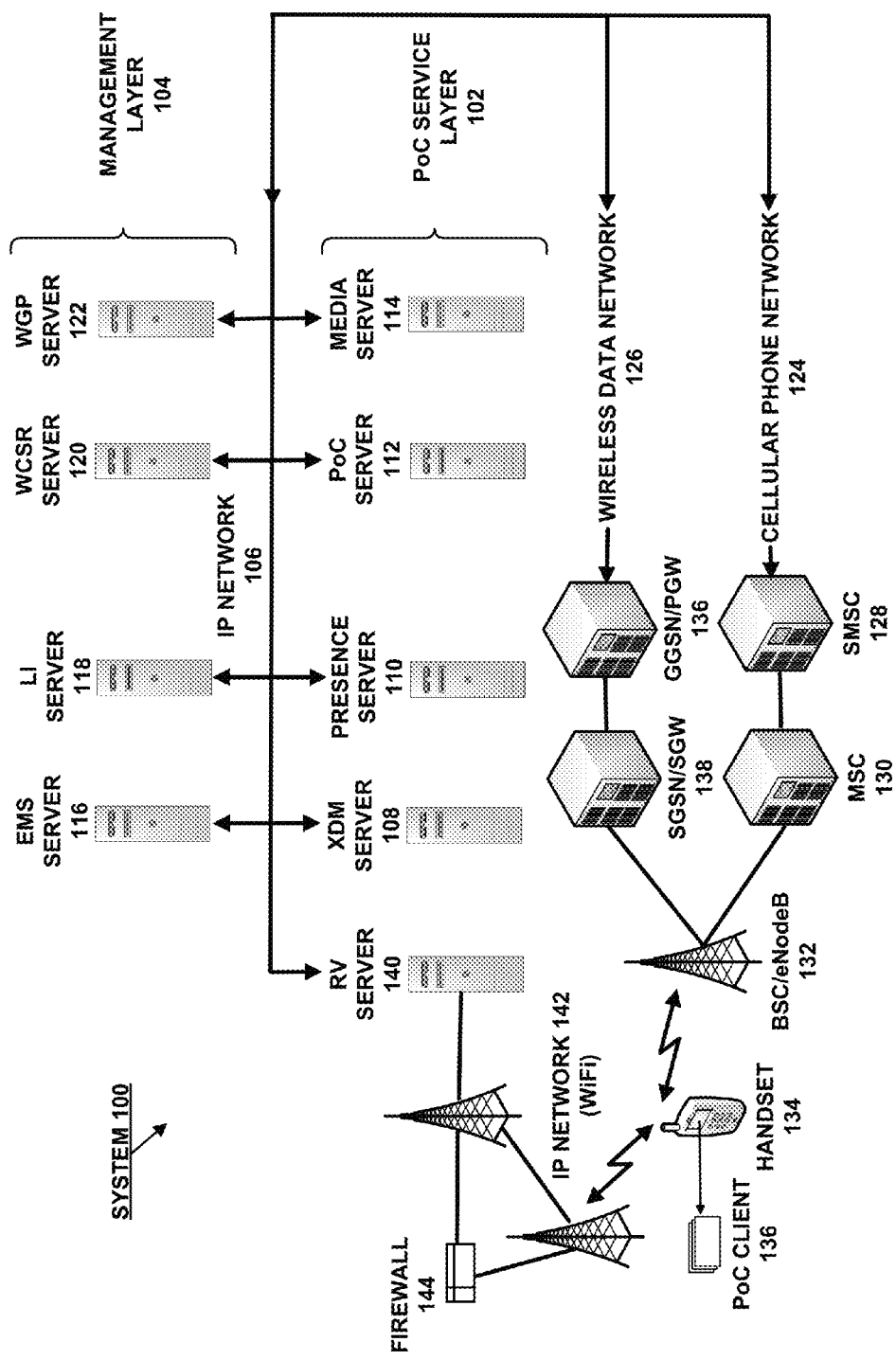
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| FAMC | Full Acknowledged Mode Communications |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SIM | Subscriber Identity Module |
| SIP | Session Initiation Protocol |
| SMMP | Short Message peer-to-peer Protocol |
| SMS | Small Message Service |
| SSL | Secure Sockets Layer protocol |
| SSRC | Synchronization SouRCe |
| TLS | Transport layer security protocol |
| UDP | User Datagram Protocol |
| URI | Uniform Resource Identifier |
| VoIP | Voice-over-IP |
| SGW | Serving GateWay |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |

| Term | Description |
| --- | --- |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| FAMC Member Set | A subset of a group of members for which FAMC applies. This could be a dynamic set based on criteria. |
| Firewall | A device that acts as a barrier to prevent unauthorized or unwanted communications between computer networks and external devices. |
| Set Availability | A composite of availability states of an FAMC member set. If all members of the FAMC member set are available for an FAMC call session, then the set is available for the FAMC call session. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signaling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 (also referred to as a mobile unit, mobile station, mobile phone, cellular phone, etc.) executing a PoC Client 136. The wireless data network 126, depending on its type, e.g., GPRS or 4G/LTE, includes one or more Gateway GPRS Support Nodes (GGSNs) or Packet Gateways (PGWs) 136 and Serving GPRS Support Nodes (SGSNs) or Serving GateWays (SGWs) 138, which also communicate with customer handsets 134 via BSCs or eNodeBs 132.

Finally, in one embodiment of the present invention, the PoC Service Layer 102 and Management Layer 104 are connected to one or more RendeVous (RV) Servers 140, which are coupled to one or more external IP networks 142, such as WiFi networks 142, possibly using one or more Firewalls 144, in order to communicate with one or more PoC Clients 136 on one or more handsets 134. Traffic to and from the wireless data networks 126 also traverses the RV Servers 140.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:
The GGSN/PGW 136 transfers IP packets between the PoC Client 136 and the various servers:
  SIP/IP signaling messages between the PoC Server 112 and PoC Client 136 for control traffic exchange (i.e., control packets) for PoC call sessions.
  RTP/IP, RTCP/IP and MBCP/IP packets between the Media Server 114 and PoC Client 136 for bearer traffic exchange (i.e., voice packets) for PoC call sessions.
  SIP/IP signaling messages between the Presence Server 110 and PoC Client 136 for presence information.
  XCAP/HTTP/IP and SIP/IP signaling between the XDM Server 108 and PoC Client 136 for document management.
The SMSC 128 handles authentication:
  The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the WiFi network 142:
The RV Server 140 transfers IP packets between the PoC Client 136 and the various servers:
  SIP/IP signaling messages between the PoC Server 112 and PoC Client 136 for control traffic exchange (i.e., control packets) for PoC call sessions.
  RTP/IP, RTCP/IP and MBCP/IP packets between the Media Server 114 and PoC Client 136 for bearer traffic exchange (i.e., voice packets) for PoC call sessions.
  SIP/IP signaling messages between the Presence Server 110 and PoC Client 136 for presence information.
  XCAP/HTTP/IP and SIP/IP signaling between the XDM Server 108 and PoC Client 136 for document management.
  SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
PoC Server 112,
Media Server 114,
Presence Server 110,
XDM Server 108, and
RV Server 140.
These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 RV Server

The RV Server 140 implements a interworking solution for the PoC Service to communicate via one or more IP network 142 access points to the PoC Clients 136. Specifically, the RV Server 140 provides PoC Service over an IP network 142 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 142. The RV Server 140 also resolves security concerns that arise with such interworking solutions.

This is necessary because the quality, performance and availability of the wireless data networks 126 typically vary from location to location based on various factors. In addressing these issues, the interworking solution implemented by the RV Server 140 provides following benefits:

- PoC Services becomes available even in those locations where a wireless data network 126 is not available, but where a general purpose IP network 142 is available. This is particularly more useful in enhancing in-building coverage for the PoC Service.
- By connecting over the IP network 142, the available IP bandwidth, quality and performance can be more streamlined and controlled since the IP network 142 (typically) has a greater capacity and throughput as compared to the wireless data network 126, which is more shared in nature.
- By utilizing the greater available bandwidth over the IP network 142, as compared to the wireless data network 126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:

Element Management System (EMS) Server 116,
Lawful Intercept (LI) Server 118,
Web Group Provisioning (WGP) Server 122, and
Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer

3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.4 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains a separate subscription for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.5 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.6 RV Server

The RV Server 140 performs interworking for the PoC service by communicating with the PoC Clients 136 via one or more IP networks 142 and/or wireless data networks 126.

The PoC Client 136 sets up one or more connections using the configured Fully Qualified Domain Name (FQDN), or absolute domain name, of the RV Server 140, which may be publicly exposed to the Internet. Secure transport protocols may (or may not) be used for the connections across the IP networks 142 and/or wireless data networks 126. For example, the PoC Clients 136 may use the Transport Layer Security (TLS) and/or Secure Sockets Layer (SSL) protocols for encrypting information transmitted over the connections between the PoC Client 136 and the RV Server 140.

In such an embodiment, all SIP signaling and voice data (RTP and RTCP) would be tunneled over the SSL/TLS connections between the PoC Client 136 and the RV Server 140. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the RV Server 140 performs as an encryption/decryption off-loader that provides end-to-end encryption for all traffic transmitted to and from the PoC Client 136. Specifically, all of the traffic sent to the PoC Client 136 is encrypted at the RV Server 140 and all the traffic received from the PoC Client 136 is decrypted at the RV Server 140.

The RV Server 140 terminates the SSL/TLS connections and aggregates or dis-aggregates the PoC Client 136 traffic to the appropriate Servers 108, 110, 112, 114, 116, 118, 120 and 122. Specifically, the RV Server 140 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the RV Server 140 is a single point-of-contact for all traffic to and from the PoC Clients 136 at an IP transport layer via the IP networks 142 and/or wireless data networks 126.

Typically, the SSL/TLS connections are persisted and used for any bidirectional data transfer between the RV Server 140, or other Servers, and the PoC Clients 136. Thus, a PoC Client 136 maintains an "always-on" connection with the RV Server 140 by periodically sending "keep-alive" messages over the SSL/TLS connections.

The system also simplifies the traversal of the Firewalls 144. Preferably, the PoC Clients 136 establish the SSL/TLS connections to the RV Server 140 over TCP poll 443, which is typically used for HTTPS communications. This allows for Firewall 144 traversal on most corporate networks, because the Firewall 144 facing (exposed to) the Internet is default configured to allow (and not deny) the SSL/TLS connections on TCP poll 443. As a result, the system does not require that any special changes be made to the Firewall 144, such as those changes typically required for VoIP deployments in corporate networks. Instead, the traffic with the PoC Clients 136 is routed over SSL/TLS connections on TCP port 443, which can traverse through the Firewalls 144 seamlessly.

3.2 Management Layer 3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.
  Create Subscriber account,
  Update Subscriber account,
  Delete Subscriber account,
  Mobile number change command,
  Forced synchronization of a Subscriber,
  Deactivate a Subscriber account,
  Reactivate a Subscriber account,
  View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:
  group management,
  contact management, and
  associations between corporations.

With regard to group management, the CAT of the WGP Server 122 includes the following operations:
  Create, Update, Delete and View Corporate Groups,
  Add, Update, Delete and View Members of a Corporate Group,
  Manage Subscribers,
  Activate and Deactivate a Corporate Subscriber,
  Change a Subscriber type from "Corporate" to "Corporate And Public", and vice versa,
  Restrict Availability, i.e., do not allow subscriber to change their presence status, and
  Manage number porting or name change via phone assignment.

With regard to contact management, the CAT of the WGP Server 122 includes the following operations:
  Phone list management,
  N×N Contact Add (e.g., N contacts may be members of N groups),
  Add, Update, Delete and View Contacts for a specific subscriber, and
  Export and Import contacts at both the subscriber and corporate level.

With regard to associations between corporations, the CAT of the WGP Server 122 includes the following operations:
  Corporate Associations Attributes,
  Association Name,
  Association ID,
  Association Mode (e.g., One-way, Two-way), and
  Restricted List.

Once the association is created and accepted, corporate administrators can create contacts and groups using the association policies. Administrators from other corporations can view the contacts, and may or may not have the capability to add, update or delete the contacts.
  Corporate ID associated per corporate subscriber,
  Central management of corporate subscribers, groups, and contacts,
  Intercorporate associations, including contacts and whitelists,
  Phone list management (e.g., N×N contact add),
  Restrict Availability, and
  Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:
  PoC Calls and Instant Personal Alert,
  Presence, and
  Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

4 State Diagram for a PoC Call Session

Figure 2:
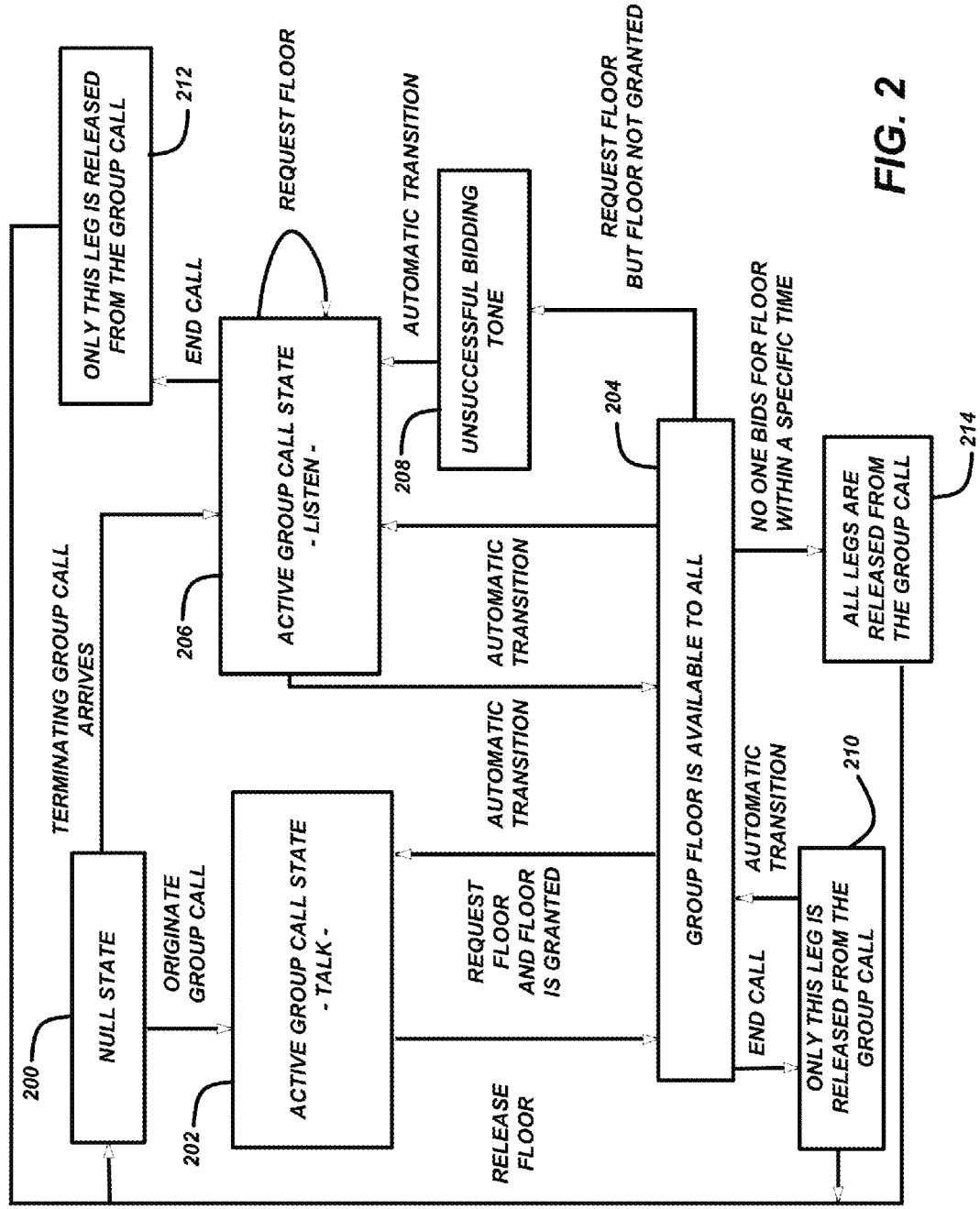
FIG. 2 is a state diagram that illustrates the operation of a PoC session according to one embodiment of the present invention.

FIG. 2 is a state diagram that illustrates the operation of a PoC call session according to one embodiment of the present invention.

State 200 represents a PoC Client 136 in a NULL state, i.e., the start of the logic. A transition out of this state is triggered by a user making a request to originate a PoC call, or by a request being made to terminate a PoC call at the handset 134. A request to originate a PoC call is normally made by pressing a PoC button, but may be initiated in this embodiment by dialing some sequence of one or more numbers on the handset 134 that are interpreted by the PoC Server 112, by pressing one or more other keys on the handset 134 that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking on the handset 134. The handset 134 uses the reverse traffic channel to send voice frames to the Media Server 114, and the Media Server 114 switches voice frames only in one direction, i.e., from talker to one or more listeners, which ensures the half-duplex operation required for a PoC call.

State 204 represents the group "floor" being available to all members of the group. When the talking user signals that the floor is released, the floor is available to all group members. The signal to release the floor is normally made by releasing the PoC button, but may be performed in this embodiment by voice activity detection, e.g., by not speaking for some time period (which is interpreted by the PoC Server 112 as a release command). All members of the group receive a "free floor" tone on their handset 134. A user who requests the floor first (in the "free-floor" state), for example, is granted the floor, wherein the system 100 sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC button, but may be performed in this embodiment by voice activity detection, e.g., by speaking for some time period (which is interpreted by the PoC Server 112 as a request command).

State 208 represents a user receiving an "unsuccessful bidding" tone on his handset 134, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 Fully Acknowledged Mode Communication (FAMC)

5.1 Introduction to FAMC

In group communications, such as a PoC call session, there are situations when communications among group members should be established only when "all members" of the group acknowledge their "availability" for the PoC call session. In one example, communications that occur between Command and Control, and a group of snipers in a "shoot/don't shoot" scenario, may be established only when all members of the group acknowledge their availability for the communications.

In normal operation, a group communication, such as a PoC call session, is established so long as there is at least one member of the group available for the communications. A Fully Acknowledged Mode Communication (FAMC) call session, however, is, in a way, the inverse of the above, in that it is a PoC call session where "a set of members" are required to be "available" and ready to participate in the PoC call session before a communication is established between the talker and listeners. Specifically, a FAMC call session is a PoC call session that can only be established when all members of a set are available for the PoC call session, wherein the set comprises all or part of a group of handsets 134.

Note that, while this description refers to FAMC call sessions as PoC call sessions, the present invention is not restricted to only this service and may apply to any type of group communications.

5.2 Problems with FAMC

In group communications, particularly PoC call sessions, where half-duplex transmission occurs among participants, call setup time is of paramount importance. This becomes even more critical when such a communication occurs in the context of public safety.

As noted above in conjunction with FIG. 2, when the originator of a PoC call session presses a PoC button, the user has to receive a "floor grant" (permit to speak) in State 202, as soon as it is determined there is at least one listener (member) affiliated with the group available to participate in the PoC call session.

In the case of FAMC, each PoC Client 136 has to be contacted through some form of signaling and an acknowledgment received (again through some for of signaling) to verify its availability for communications. For FAMC, the originator cannot be given a floor grant in State 202, until all of the PoC Clients 136 have acknowledged their availability.

A typical acceptable delay in PoC call sessions between an originator requesting the PoC call session and when the originator receives a floor grant (permit to speak) is on the order of 300 ms. This time delay cannot be met in FAMC call sessions until acknowledgments from all of the PoC Clients 136 are received, unless prior knowledge on the availability of these PoC Clients 136 is readily available. The present invention described herein proposes methods on how such prior knowledge can be obtained and maintained.

5.3 FAMC Availability

The knowledge of the availability or unavailability of the PoC Clients 136 for an FAMC call session is used to decide whether the FAMC call session is allowed to be set up. In this method of determining availability, when a set of PoC Clients 136 is designated for an FAMC call session, which may comprise all or part of a group of handsets 134, then the availability or unavailability of all of the members of the set are monitored and a composite availability, known as the set availability, is made available to all watchers of the set.

When an authorized user initiates an FAMC call session, the set availability is derived from the availability or unavailability of all of the members that belong to the set. The availability or unavailability of all of members that belong to the set is known using the presence functionality of the Presence Server 110. This set availability is examined to ensure that the all the members that constitute the set are available for communications.

For a particular set of members, the Presence Server 110 determines each member's availability to determine the set availability, and a corresponding presence notification is sent to all interested watchers of that set. The presence notification may indicate the availability or unavailability of the set as a whole. The presence notification may also indicate the availability or unavailability of individual members of that set.

Preferably, the availability or unavailability of each set is maintained in real-time through various mechanisms (described in more detail below). Then, when an originator presses a button on the handset 134 to establish an FAMC call session, the PoC Client 136 can initiate such a session based on the known availability of the set, without having to initiate a check of the availability of the set at the time of session establishment and incurring the delays associated with that check. If the set is unavailable, then the user will not be able to originate an FAMC call session to this set.

5.3.1 Criteria for Inclusion in an FAMC Member Set

An FAMC Member Set includes one or more criteria that determine whether the set of members is available for the FAMC call session. The criteria may identify one or more of the members that must be available for the FAMC call session, the number of the members that must be available for the FAMC call session, and/or the geographical locations of the members that must be available for the FAMC call session.

For example, such criteria may include, but are not limited to, the following:

- All the members of the set are registered with the system 100 and ready to accept a call,
- A specified minimum number of members of the set are registered with the system 100 and ready to accept a call,
- Specifically identified members of the set (i.e., known as "critical members") are registered with the system 100 and ready to accept a call,
- All the members of the set are registered with the system 100 and ready to accept a call from within a certain geographical area,
- A specified minimum number of members of the set within a geographical area are registered with the system 100 and ready to accept a call,
- Specifically identified members of the set within a geographical area are registered with the system 100 and ready to accept a call, or
- There is at least one member of the of the set in each of the different geographical locations registered with the system 100 and ready to accept a call.

5.3.2 Determining Availability

Before the PoC Server 112 can apply the rules of availability criteria, it has to derive availability information regarding each of the members of the set. As noted above, the availability or unavailability of the members of the set may be monitored in real-time and made available to all watchers of the set through one or more presence notifications. The presence notifications may indicate an availability or unavailability of the set as a whole and/or may indicate an availability or unavailability of individual members of the set.

In this regard, the PoC Server 112 may retrieve this information based on a combination of methods described below:

- Explicit presence updates from each of the PoC Clients 136 that are stored in the Presence Server 110,
- Specific server-based signaling that queries PoC Clients 136 to establish a definitive and unambiguous state,
- A query to the Presence Server 110, which may have knowledge of this information regarding the set and members of the set, or
- Registering as a watcher with the Presence Server 110 for certain events regarding the set and members of the set.

5.3.3 Presence Updates from the PoC Client

In this method, the PoC Client 136 periodically publishes its status to the Presence Server 110 using a SIP Publish message, which in turn is transmitted to or accessed by the PoC Server 112 and/or the PoC Clients 136 of other members of the set. The PoC Server 112 and the PoC Clients 136 use the members' presence status along with the criteria for inclusion in the set to determine whether an FAMC call session may be established and update the set's availability or unavailability to indicate whether an FAMC call session is allowed. If the criterion for the FAMC call session is the presence of some pre-defined number of members of the set or specific members of the set, then the set's availability will be marked to allow the FAMC session to be set up. In cases where there are multiple criteria for inclusion in the FAMC Member Set, then the set's availability is marked to allow an FAMC call session when all of the multiple criteria are met.

5.3.4 Server Based Availability Determination

In addition to periodic or triggered SIP Publish messages transmitted from the PoC Client 136, the PoC Server 112 or the Presence Server 110 may initiate communications with the PoC Clients 136 for members of a set to establish definitive states of these members. These communications may be initiated on a periodic basis or may be triggered by events, such as the communicated intent by one of its members to initiate an FAMC call session. Based on the responses received from the PoC Clients 136 for the members of a set, the PoC Server 112 or the Presence Server 110 may update the set's availability or unavailability for an FAMC call session.

If multiple criteria are specified for inclusion in the FAMC Member Set, then the PoC Server 112 or the Presence Server 110 may initiate communications with the PoC Clients 136 for a union of members of the set that meet these multiple criteria. For example, a first criteria may be that all members are in a certain geographical area and a second criteria may be that specified members A, B, C, and D are available. In such an example, any members meeting either criteria would receive a message from the PoC Server 112 or the Presence Server 110.

5.1.5 Using Underlying System Capabilities

In cases where underlying system 100 capabilities can be used to determine the availability of members of the set, the PoC Server 112 or the Presence Server 110 can query the system 100 or components thereof for that information. The PoC Server 112 or the Presence Server 110 may be able to register for event notifications from the system 100 that provides information on individual members' availability or unavailability.

CONCLUSION

In conclusion, the present invention relates to a system and method for providing advanced voice services in one or more wireless communications networks, and more specifically, to a method and framework to achieve a fully acknowledged mode communication (FAMC) in Push-to-talk-over-Cellular (PoC). The system and method includes one or more servers that interface to the wireless communications networks to perform advanced voice services for one or more mobile units in the wireless communications networks, wherein the advanced voice services include an instant two-way half-duplex voice call within a group of the mobile units comprising a Push-to-Talk-over-Cellular (PoC) call session. Both the servers and the mobile units that use the advanced group services communicate with each other using control messages within the wireless communications networks, and at least one of the servers switches voice messages for the advanced group services between the mobile units across the wireless communications networks.

At least one of the servers manages the PoC call session by acting as an arbitrator for the PoC call session and controls the sending of the control messages and the voice messages to and from the mobile units. Moreover, the PoC call session comprises a Fully Acknowledged Mode Communication (FAMC) call session that can only be established when all members of a set are available for the PoC call session, wherein the set comprises part or all of the group of mobile units.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A server of a push-to-talk (PTT) system comprising:
   a processor; and
   a non-transitory computer readable storage medium storing programming for execution by the processor, the programming including instructions to:
      receive a call session initiation request from a first handset to establish a call session between the first handset and a plurality of second handsets;
      in response to the call session initiation request, determine whether the plurality of second handsets is available for the call session as a whole in accordance with one or more criteria;
      in response to a determination that the plurality of second handsets is available for the call session as a whole, establish the call session between the first handset and the plurality of second handsets; and
      in response to a determination that the plurality of second handsets is not available for the call session as a whole, not establish the call session between the first handset and the plurality of second handsets, wherein the call session between the first handset and the plurality of second handsets is not established when at least one second handset of the plurality of second handsets is available for the call session and the plurality of second handsets is not available for the call session as a whole.

2. The server of claim 1, wherein the one or more criteria is specific to the plurality of second handsets as a whole.

3. The server of claim 1, wherein the one or more criteria identify one or more second ones of the plurality of second handsets that must be registered with the PTT system and ready to accept the call session, and wherein the call session is not established when any of the one or more second ones of the plurality of second handsets is not registered with the PTT system or not ready to accept the call session.

4. The server of claim 1, wherein the one or more criteria comprise a minimum number of handsets of the plurality of second handsets that must be registered with the PTT system and ready to accept the call session, and wherein the call session is not established when a number of handsets of the plurality of second handsets registered with the PTT system and ready to accept the call session is less than the minimum number.

5. The server of claim 1, wherein the one or more criteria comprise a geographic location where a third handset of the plurality of second handsets must be located for the call session, and wherein the call session is not established when the third handset is not located in the geographic location.

6. The server of claim 1, wherein a presence server of the PTT system monitors presence information regarding a respective availability of each of the plurality of second handsets in real-time, and wherein the presence server provides the presence information to the server through one or more presence notifications, wherein the programming includes further instructions to register the server as a watcher of the plurality of second handsets with the presence server.

7. The system of claim 6, wherein the one or more presence notifications indicate an availability of the plurality of second handsets as a whole, wherein presence information of the plurality of second handsets as a whole is separate from presence information of each of the plurality of second handsets.

8. The system of claim 6, wherein the one or more presence notifications indicate an availability of individual ones of the plurality of second handsets.

9. The system of claim 6, wherein the presence server determines availability of the plurality of second handsets as a whole from presence updates received by the presence server from the plurality of second handsets.

10. The system of claim 6, wherein the respective availability of each of the plurality of second handsets is determined by querying each of the plurality of second handsets.

11. The system of claim 10, wherein each of the plurality of second handsets is queried at regular time intervals.

12. The system of claim 10, wherein each of the plurality of second handsets is queried based on one or more triggering events.

13. The system of claim 6, wherein the respective availability of each of the plurality of second handsets is determined by querying a database.

14. The system of claim 6, wherein the respective availability of each of the plurality of second handsets is determined from capabilities of one or more wireless communications networks used by the first handset and the plurality of second handsets to communicate with the PTT system.

15. A method comprising:
   receiving, by a server of a push-to-talk (PTT) system, a call session initiation request from a first handset to establish a call session between the first handset and a plurality of second handsets;
   in response to the call session initiation request, determining, by the server, whether the plurality of second handsets is available for the call session as a whole in accordance with one or more criteria;
   in response to a determination that the plurality of second handsets is available for the call session as a whole, establishing, by the server, the call session between the first handset and the plurality of second handsets; and
   in response to a determination that the plurality of second handsets is not available for the call session as a whole, not establishing, by the server, the call session between the first handset and the plurality of second handsets, wherein the call session between the first handset and the plurality of second handsets is not established when at least one second handset of the plurality of second handsets is available for the call session and the plurality of second handsets is not available for the call session as a whole.

16. The method of claim 15, wherein the one or more criteria is specific to the plurality of second handsets as a whole.

17. The method of claim 15, wherein the one or more criteria identify one or more second ones of the plurality of second handsets that must be registered with the PTT system and ready to accept the call session, and wherein the call session is not established when any of the one or more second ones of the plurality of second handsets is not registered with the PTT system or not ready to accept the call session.

18. The method of claim 15, wherein the one or more criteria comprise a minimum number of handsets of the plurality of second handsets that must be registered with the PTT system and ready to accept the call session, and wherein the call session is not established when a number of handsets of the plurality of second handsets registered with the PTT system and ready to accept the call session is less than the minimum number.

19. The method of claim 15, wherein the one or more criteria comprise a geographic location where a third handset of the plurality of second handsets must be located for the call session, and wherein the call session is not established when the third handset is not located in the geographic location.

20. The method of claim 15, wherein a presence server of the PTT system monitors presence information regarding a respective availability of each of the plurality of second handsets in real-time, and wherein the presence server provides the presence information to the server through one or more presence notifications, wherein the programming includes further instructions to register the server as a watcher of the plurality of second handsets with the presence server.

21. The method of claim 20, wherein the one or more presence notifications indicate an availability of the plurality of second handsets as a whole, an availability of individual ones of the plurality of second handsets, or a combination thereof.

22. The method of claim 20, wherein the presence server determines availability of the plurality of second handsets from: presence updates received by the presence server from the first handset and the plurality of second handsets, queries of each of the plurality of second handsets, capabilities of one or more wireless communications networks used by the first handset and the plurality of second handsets to communicate with the PTT system, or a combination thereof.

23. A method comprising:
transmitting, by a client on a first handset registered with a push-to-talk (PTT) system, a call session initiation request to a server of the PTT system requesting a call session between the first handset and a plurality of second handsets; and
in response to a determination that the plurality of second handsets is available for the call session as a whole, receiving, by the client, a floor grant for the call session between the first handset and the plurality of second handsets, wherein the call session between the first handset and the plurality of second handsets is not established when at least one second handset of the plurality of second handsets is available for the call session and the plurality of second handsets is not available for the call session as a whole, and wherein whether the plurality of second handsets is available for the call session as a whole is determined in accordance with one or more criteria.

24. The method of claim 23, wherein the one or more criteria identify one or more second ones of the plurality of second handsets that must be registered with the PTT system and ready to accept the call session, and wherein the call session is not established when any of the one or more second ones of the plurality of second handsets is not registered with the PTT system or not ready to accept the call session.

25. The method of claim 23, wherein the one or more criteria comprise a minimum number of handsets of the plurality of second handsets that must be registered with the PTT system and ready to accept the call session, and wherein the call session is not established when a number of handsets of the plurality of second handsets registered with the PTT system and ready to accept the call session is less than the minimum number.

26. The method of claim 23, wherein the one or more criteria comprise a geographic location where a third handset of the plurality of second handsets must be located for the call session, and wherein the call session is not established when the third handset is not located in the geographic location.

* * * * *